(12) United States Patent
Mårtensson

(10) Patent No.: US 12,513,415 B2
(45) Date of Patent: Dec. 30, 2025

(54) STRAY LIGHT MITIGATION SYSTEMS AND METHODS

(71) Applicant: FLIR Systems AB, Täby (SE)

(72) Inventor: Karl Mårtensson, Sollentuna (SE)

(73) Assignee: FLIR Systems AB, Täby (SE)

( * ) Notice: Subject to any disclaimer, the term of this patent is extended or adjusted under 35 U.S.C. 154(b) by 114 days.

(21) Appl. No.: 18/509,067

(22) Filed: Nov. 14, 2023

(65) Prior Publication Data

US 2024/0089610 A1    Mar. 14, 2024

Related U.S. Application Data

(63) Continuation of application No. PCT/US2022/028154, filed on May 6, 2022.

(60) Provisional application No. 63/191,291, filed on May 20, 2021.

(51) Int. Cl.
| | |
|---|---|
| *G06F 16/2458* | (2019.01) |
| *G06T 5/50* | (2006.01) |
| *H04N 23/20* | (2023.01) |
| *H04N 23/23* | (2023.01) |
| *H04N 23/76* | (2023.01) |

(52) U.S. Cl.
CPC ............... *H04N 23/76* (2023.01); *G06T 5/50* (2013.01); *H04N 23/20* (2023.01); *H04N 23/23* (2023.01); *G06T 2207/10048* (2013.01); *G06T 2207/20212* (2013.01)

(58) Field of Classification Search
CPC ........ H04N 23/76; H04N 23/20; H04N 23/23; H04N 25/61; G06T 5/50; G06T 2207/10048; G06T 2207/20212; G06T 5/73; G06T 2207/10016; G06T 2207/20201; G06T 5/10
See application file for complete search history.

(56) References Cited

U.S. PATENT DOCUMENTS

| | | | |
|---|---|---|---|
| 4,526,470 A | | 7/1985 | Kaye |
| 6,285,799 B1 * | | 9/2001 | Dance ....................... G06T 5/73 382/260 |
| 8,554,009 B2 | | 10/2013 | Zong et al. |
| 9,565,371 B2 | | 2/2017 | Johansson et al. |
| 12,079,233 B1 * | | 9/2024 | Mishra ................ G06F 16/2465 |
| 2013/0247365 A1 | | 9/2013 | Liu et al. |

(Continued)

FOREIGN PATENT DOCUMENTS

DE      60309545      9/2007

OTHER PUBLICATIONS

Kim, Shinwook et al., "Nonuniformity correction scheme considering the effects of internal thermal stray light," Optical Engineering, vol. 56, No. 1, Jan. 2017.

(Continued)

*Primary Examiner* — Howard D Brown, Jr.
(74) *Attorney, Agent, or Firm* — Haynes and Boone, LLP

(57) ABSTRACT

Techniques for facilitating stray light mitigation are provided. In one example, a method includes determining moving averages associated with an image. Each of the moving averages is associated with a respective window size. The method further includes determining a kernel based on the moving averages. The method further includes generating a stray light compensated image based on the image and the kernel. Related devices and systems are also provided.

20 Claims, 5 Drawing Sheets

(56) References Cited

U.S. PATENT DOCUMENTS

| | | | | |
|---|---|---|---|---|
| 2014/0247365 A1* | 9/2014 | Gardner | ............... | G06T 5/70 |
| | | | | 348/241 |
| 2015/0254813 A1* | 9/2015 | Foi | ............... | H04N 5/21 |
| | | | | 382/275 |
| 2024/0089610 A1* | 3/2024 | Mårtensson | ............... | G06T 5/10 |

OTHER PUBLICATIONS

Ong, Chin Ann et al., "An Enhanced NAS-RIF Algorithm for Blind Image Deconvolution," IEEE Transactions on Image Processing, vol. 8, No. 7, pp. 988-992, Jul. 1999.

Pirinen, Aleksis et al., "Stray Light Compensation in Optical Systems," Masters Thesis—Lund University, Jun. 2015.

Syverud, Myles, "Applying Multi-objective Optimization to Thermography," Kth Royal Institute of Technology, School of Industrial Engineering and Management, 2018.

Wei, Jianing et al., "Fast Space-varying Convolution and Its Application in Stray Light Reduction," Feb. 2009.

* cited by examiner

STRAY LIGHT MITIGATION SYSTEMS AND METHODS

CROSS REFERENCE TO RELATED APPLICATIONS

This application is a continuation of International Patent Application No. PCT/US2022/028154 filed May 6, 2022 and entitled "STRAY LIGHT MITIGATION SYSTEMS AND METHODS," which claims priority to U.S. Provisional Patent Application No. 63/191,291 filed May 20, 2021 and entitled "STRAY LIGHT MITIGATION SYSTEMS AND METHODS," all of which are hereby incorporated by reference in their entirety.

TECHNICAL FIELD

One or more embodiments relate generally to imaging and more particularly, for example, to stray light mitigation systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an imaging system includes a processing circuit configured to determine moving averages associated with an image. Each of the moving averages is associated with a respective window size. The processing circuit is further configured to determine a kernel based on the moving averages. The processing circuit is further configured to generate a stray light compensated image based on the image and the kernel.

In one or more embodiments, a method includes determining moving averages associated with an image. Each of the moving averages is associated with a respective window size. The method further includes determining a kernel based on the moving averages. The method further includes generating a stray light compensated image based on the image and the kernel.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
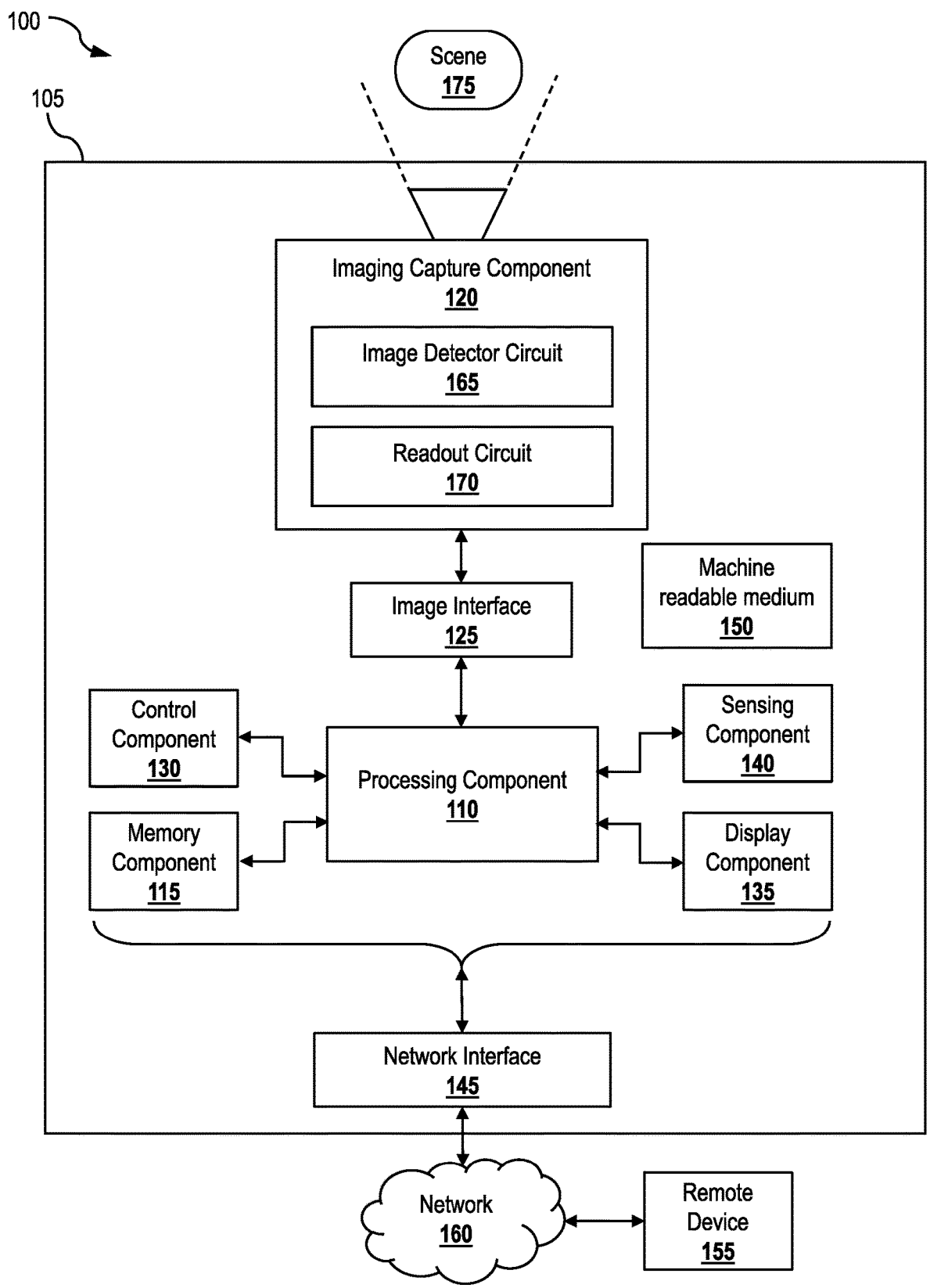
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate stray light mitigation. Stray light is generally present in imaging systems. In an aspect, stray light may include and/or refer to light captured by a detector array of an imaging system that does not originate from an intended source (e.g., a target source). Stray light captured by the detector array generally results in undesirable effects in captured images, such as artifacts, noise, and distortion. Mitigation of stray light may allow for improved radiometric accuracy. Dependent on application, the detector array may be sensitive to stray light and light originating from the intended source in the visible-light waveband, infrared light waveband, and/or other wavebands of interest.

An imaging system may be characterized at least in part using a point spread function (PSF). Capture/generation of an image of a scene by a detector array of the imaging system may be represented as a convolution of the scene and the PSF associated with the imaging system. In this regard, in some cases, the PSF may be considered an impulse response of the imaging system used to capture the scene, and the image may be considered a distorted representation of the scene. A response of the imaging system to light, including stray light, may be encompassed by the PSF. Such distortion may be due to components (e.g., lenses, windows, etc.) along an optical path to the detector array of the imaging system. At a time k, an image I(k) (also denoted as Image (k)) captured by an imaging system may be provided by:

$$I(k)=PSF*Scene(k) \qquad \text{Equation (1)}$$

where * denotes a convolution operator.

In some embodiments, an imaging system includes a detector array and a processing circuit. The detector array includes detectors (e.g., also referred to as detector pixels, detector elements, or simply pixels). Each detector pixel detects incident EM radiation and generates images (e.g., infrared images, visible-light images) indicative of the detected EM radiation of a scene. In some embodiments, the detector array is used to detect infrared radiation (e.g., thermal infrared radiation). For pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C.

The processing circuit receives images from the detector array and/or memory in which captured images are stored and perform various computations to generate stray light compensated images. In one or more embodiments, the stray light in captured images may be mitigated using convolutions with multiple kernels. In some aspects, the kernels used in stray light mitigation may be built up with a number of moving averages (e.g., two-dimensional moving averages) to mitigate stray light in the image I(k). In some cases, the moving averages may be performed on the image I(k) and/or an image I(k−1) that precedes the image I(k). In some cases, the image I(k−1) is temporally adjacent to and precedes the image I(k). Each moving average may be associated with a respective window size. In some cases, the window associated with a moving average may be a square window having a window length equal to a window width. In other cases, the window may be a non-square window.

Since the image may be represented as a transformation of the scene by the PSF via a convolution, a pixel value is a weighted average of neighboring pixel values in the scene. The weighted average may be large or small depending on whether the neighboring pixel values are large or small. As such, for a given object in the scene and a pixel that captures a portion of the object, neighboring pixel values of the pixel may be large or small based in part on a spatial size of the object. Stray light mitigation may account for this effect to reduce or eliminate dependency of measurement values (e.g., temperature values for thermal imaging) on a size of the object in the scene. In various embodiments, the kernels built up of moving averages (e.g., two-dimensional moving averages) may provide (e.g., may be used as) an inverse PSF that allows for faster computations (e.g., and thus usage of these kernels more amenable for real-time or near real-time imaging systems) than directly determining an inverse of the PSF, which is generally computationally intensive.

Although various embodiments for stray light mitigation are described with respect to infrared imaging (e.g., thermal infrared imaging), stray light mitigation may be applied to images of other wavebands. Various embodiments of methods and systems disclosed herein may be included in or implemented as various devices and systems such as visible-light imaging systems, infrared imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, mobile digital cameras, video surveillance systems, video processing systems, or other systems or devices that may need to obtain image data in one or multiple portions of the EM spectrum.

Referring now to the drawings, FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include an imaging device 105. By way of non-limiting examples, the imaging device 105 may be, may include, or may be a part of an infrared camera, a visible-light camera, a tablet computer, a laptop, a personal digital assistant (PDA), a mobile device, a desktop computer, or other electronic device. The imaging device 105 may include a housing that at least partially encloses components of the imaging device 105, such as to facilitate compactness and protection of the imaging device 105. For example, the solid box labeled 105 in FIG. 1 may represent a housing of the imaging device 105. The housing may contain more, fewer, and/or different components of the imaging device 105 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 105 includes, according to one implementation, a processing component 110, a memory component 115, an image capture component 120, an image interface 125, a control component 130, a display component 135, a sensing component 140, and/or a network interface 145. The processing component 110, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 110 may be configured to interface and communicate with the various other components (e.g., 115, 120, 125, 130, 135, 140, 145, etc.) of the imaging system 100 to perform such operations. For example, the processing component 110 may be configured to process captured image data received from the imaging capture component 120, store the image data in the memory component 115, and/or retrieve stored image data from the memory component 115. In one aspect, the processing component 110 may be configured to perform various system control operations (e.g., to control communications and operations of various components of the imaging system 100) and other image processing operations (e.g., data conversion, data transformation, data compression, video analytics, etc.). In one case, various convolutions and/or other computations associated with stray light mitigation may be performed using an FPGA of the processing component 105.

The memory component 115 includes, in one embodiment, one or more memory devices configured to store data and information, including infrared image data and information. The memory component 115 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 110 may be configured to execute software instructions stored in the memory component 115 so as to perform method and process steps and/or operations. The processing component 105 and/or the image interface 120 may be configured to store in the memory component 110 images or digital image data captured by the image capture component 115.

In some embodiments, a separate machine-readable medium 150 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 150 may be portable and/or located separate from the imaging device 105, with the stored software instructions and/or data provided to the imaging device 105 by coupling the machine-readable medium 150 to the imaging device 105 and/or by the imaging device 105 downloading (e.g., via a wired link and/or a wireless link) from the machine-readable medium 150. It should be appreciated that various modules may be integrated in software and/or hardware as part of the processing component 110, with code (e.g., software or configuration data) for the modules stored, for example, in the memory component 115.

The imaging device 105 may be a video and/or still camera to capture and process images and/or videos of a scene 175. In this regard, the image capture component 120 of the imaging device 105 may be configured to capture images (e.g., still and/or video images) of the scene 175 in a particular spectrum or modality. The image capture component 120 includes an image detector circuit 165 (e.g., a visible-light detector circuit, a thermal infrared detector circuit) and a readout circuit 170 (e.g., an ROIC). For example, the image capture component 120 may include an IR imaging sensor (e.g., IR imaging sensor array) configured to detect IR radiation in the near, middle, and/or far IR spectrum and provide IR images (e.g., IR image data or signal) representative of the IR radiation from the scene 175. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 μm to 5 μm), and/or long-wave IR (LWIR) radiation (e.g., EM radiation with wavelength of 7 μm to 14 μm), or any desired IR wavelengths (e.g., generally in the 0.7 μm to 14 μm range). In other aspects, the image detector circuit 165 may capture radiation from one or more other wavebands of the EM spectrum, such as visible light, ultraviolet light, and so forth.

The image detector circuit 165 may capture image data (e.g., infrared image data) associated with the scene 175. To capture a detector output image, the image detector circuit 165 may detect image data of the scene 175 (e.g., in the form of EM radiation) and generate pixel values of the image based on the scene 175. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The detector output image may be, or may be considered, a data structure that includes pixels and is a representation of the image data associated with the scene 175, with each pixel having a pixel value that represents EM radiation emitted or reflected from a portion of the scene 175 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be a visible-light image. In another example, the detector output image may be an infrared image (e.g., thermal infrared image). For a thermal infrared image (e.g., also referred to as a thermal image), each pixel value of the thermal infrared image may represent a temperature of a corresponding portion of the scene 175.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 110 facilitated by the image interface 125. An image capturing frame rate may refer to the rate (e.g., detector output images per second) at which images are detected/output in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIL. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 115 may include one or more filters adapted to pass radiation of some wavelengths but substantially block radiation of other wavelengths. For example, the image capture component 120 may be an IR imaging device that includes one or more filters adapted to pass IR radiation of some wavelengths while substantially blocking IR radiation of other wavelengths (e.g., MWIR filters, thermal IR filters, and narrowband filters). In this example, such filters may be utilized to tailor the image capture component 120 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 120 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 120 may include a complementary metal oxide semiconductor (CMOS) sensor or a charge-coupled device (CCD) sensor that can be found in any consumer camera (e.g., visible light camera).

Other imaging sensors that may be embodied in the image capture component 120 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 120 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 125 may include, in some embodiments, appropriate input ports, connectors, switches, and/or circuitry configured to interface with external devices (e.g., a remote device 155 and/or other devices) to receive images (e.g., digital image data) generated by or otherwise stored at the external devices. In an aspect, the image interface 125 may include a serial interface and telemetry line for providing metadata associated with image data. The received images or image data may be provided to the processing component 110. In this regard, the received images or image data may be converted into signals or data suitable for processing by the processing component 110. For example, in one embodiment, the image interface 125 may be configured to receive analog video data and convert it into suitable digital data to be provided to the processing component 110.

The image interface 125 may include various standard video ports, which may be connected to a video player, a video camera, or other devices capable of generating standard video signals, and may convert the received video signals into digital video/image data suitable for processing by the processing component 110. In some embodiments, the image interface 125 may also be configured to interface with and receive images (e.g., image data) from the image capture component 120. In other embodiments, the image capture component 120 may interface directly with the processing component 110.

The control component 130 includes, in one embodiment, a user input and/or an interface device, such as a rotatable knob (e.g., potentiometer), push buttons, slide bar, keyboard, and/or other devices, that is adapted to generate a user input control signal. The processing component 110 may be configured to sense control input signals from a user via the control component 130 and respond to any sensed control input signals received therefrom. The processing component 110 may be configured to interpret such a control input signal as a value, as generally understood by one skilled in the art. In one embodiment, the control component 130 may include a control unit (e.g., a wired or wireless handheld control unit) having push buttons adapted to interface with a user and receive user input control values. In one implementation, the push buttons of the control unit may be used to control various functions of the imaging device 105, such as autofocus, menu enable and selection, field of view, brightness, contrast, noise filtering, image enhancement, and/or various other features.

The display component 135 includes, in one embodiment, an image display device (e.g., a liquid crystal display (LCD)) or various other types of generally known video displays or monitors. The processing component 110 may be configured to display image data and information on the display component 135. The processing component 110 may be configured to retrieve image data and information from the memory component 115 and display any retrieved image data and information on the display component 135. The display component 135 may include display circuitry, which may be utilized by the processing component 110 to display image data and information. The display component 135 may be adapted to receive image data and information directly from the image capture component 120, processing component 110, and/or image interface 125, or the image data and information may be transferred from the memory component 115 via the processing component 110. In some aspects, the control component 130 may be implemented as part of the display component 135. For example, a touchscreen of the imaging device 105 may provide both the control component 130 (e.g., for receiving user input via taps and/or other gestures) and the display component 135 of the imaging device 105.

The sensing component 140 includes, in one embodiment, one or more sensors of various types, depending on the application or implementation requirements, as would be understood by one skilled in the art. Sensors of the sensing component 140 provide data and/or information to at least the processing component 110. In one aspect, the processing component 110 may be configured to communicate with the sensing component 140. In various implementations, the sensing component 140 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 140 may represent conventional sensors as generally known by one skilled in the art for monitoring various conditions (e.g., environmental conditions) that may have an effect (e.g., on the image appearance) on the image data provided by the image capture component 120.

In some implementations, the sensing component 140 (e.g., one or more sensors) may include devices that relay information to the processing component 110 via wired and/or wireless communication. For example, the sensing component 140 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 110 can use the information (e.g., sensing data) retrieved from the sensing component 140 to modify a configuration of the image capture component 120 (e.g., adjusting a light sensitivity level, adjusting a direction or angle of the image capture component 120, adjusting an aperture, etc.).

In some embodiments, various components of the imaging system 100 may be distributed and in communication with one another over a network 160. In this regard, the imaging device 105 may include a network interface 145 configured to facilitate wired and/or wireless communication among various components of the imaging system 100 over the network 160. In such embodiments, components may also be replicated if desired for particular applications of the imaging system 100. That is, components configured for same or similar operations may be distributed over a network. Further, all or part of any one of the various components may be implemented using appropriate components of the remote device 155 (e.g., a conventional digital video recorder (DVR), a computer configured for image processing, and/or other device) in communication with various components of the imaging system 100 via the network interface 145 over the network 160, if desired. Thus, for example, all or part of the processing component 110, all or part of the memory component 115, and/or all of part of the display component 135 may be implemented or replicated at the remote device 155. In some embodiments, the imaging system 100 may not include imaging sensors (e.g., image capture component 120), but instead receive images or image data from imaging sensors located separately and remotely from the processing component 110 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 110 may be combined with the memory component 115, image capture component 120, image interface 125, display component 135, sensing component 140, and/or network interface 145. In another example, the processing component 110 may be combined with the image capture component 120, such that certain functions of processing component 110 are performed by circuitry (e.g., a processor, a microprocessor, a logic device, a microcontroller, etc.) within the image capture component 120.

Figure 2:
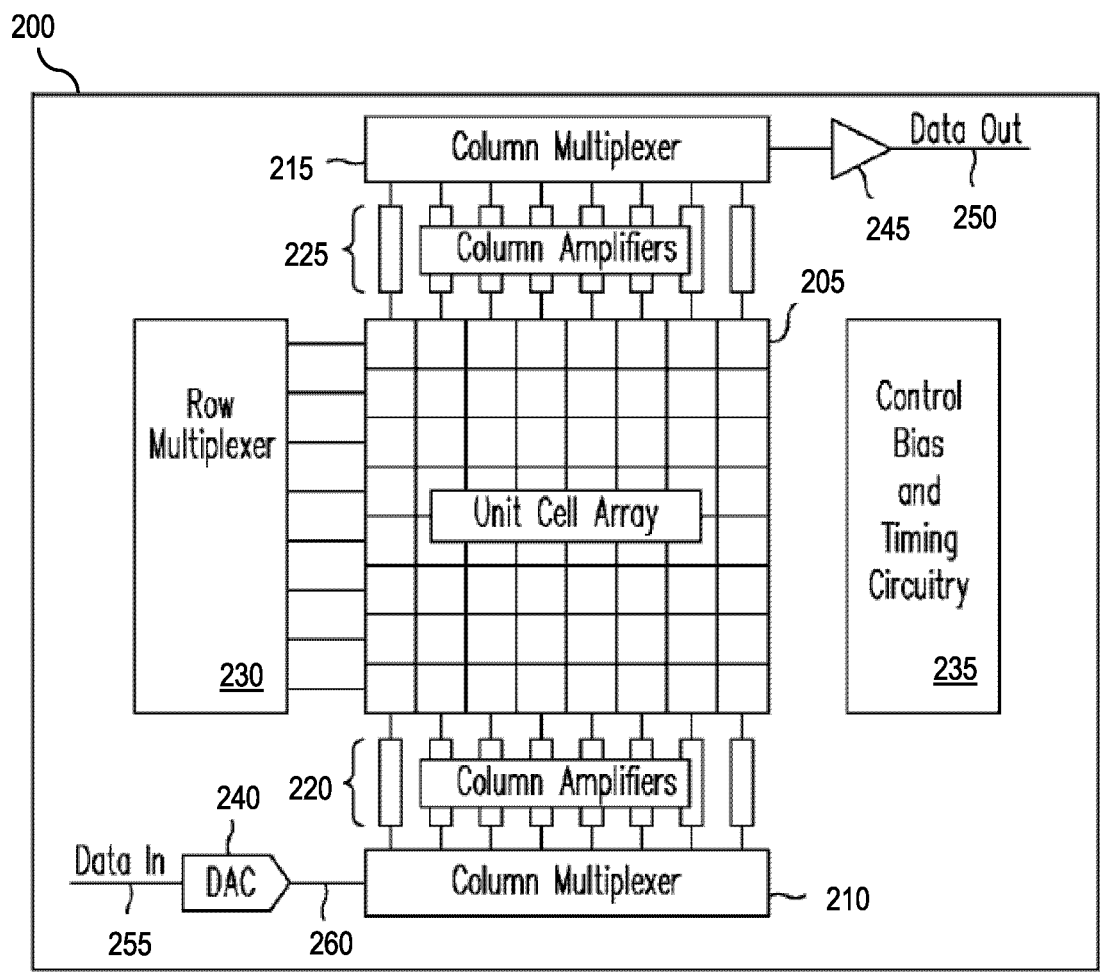
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 120 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 110 of FIG. 1), memory (e.g., the memory component 115 of FIG. 1), display device (e.g., the display component 135 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., visible-light, IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 110 and/or image capture component 120 of FIG. 1.

In an embodiment, the image sensor assembly 200 may be implemented as part of an imaging device (e.g., the imaging device 105). In addition to the various components of the image sensor assembly 200, the imaging device may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., flat-field correction or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

In one or more embodiments, stray light in captured images (e.g., visible-light images, infrared images) may be mitigated to obtain stray light compensated images (e.g., also referred to as stray light mitigated images). Stray light is generally present in all optical systems. In an aspect, stray light may include and/or refer to light captured by sensors of the optical systems that does not originate from an intended source (e.g., a target source). Stray light captured by an optical system may result in undesirable effects in captured images, such as artifacts, noise, and distortion. Mitigation of stray light may allow for improved radiometric accuracy. Dependent on application, the stray light and the light originating from the intended source may include visible-light, infrared light, and/or light of other wavebands of interest. As provided above, an optical system may be characterized at least in part using a PSF. Capture/generation of an image of a scene by sensors of the optical system may be represented as a convolution of the scene and the PSF associated with the optical system, as set forth in Equation (1).

In one or more embodiments, the stray light in captured images may be mitigated using convolutions with multiple kernels. Such kernels may provide (e.g., may be used as) an inverse PSF that allows for faster computations (e.g., and thus usage of these kernels more amenable for real-time or near real-time optical systems) than directly determining an inverse of the PSF, which is generally computationally intensive. In some aspects, the kernels used in stray light mitigation may be built up with a number of moving averages (e.g., two-dimensional moving averages). Each moving average may be associated with a respective window size. In some cases, the window associated with a moving average may be a square window having a window length equal to a window width. In some cases, the window may be a non-square window, such as a rectangular window having a window length different from a window width, a non-rectangular window, or generally any appropriate window shape/dimensions.

For some applications/embodiments, stray light mitigation may be performed to mitigate infrared stray light captured by an infrared sensor device (e.g., a thermal infrared sensor device) of a thermal optical system. In thermal optical systems (e.g., also referred to as thermographic optical systems), stray light related to the PSF may affect a measurement reading (e.g., temperature reading) of different sized objects in a scene. In some cases, small, hot objects in a scene may be determined by a thermal optical system to be cooler than larger objects with the same temperature.

Figure 3A:
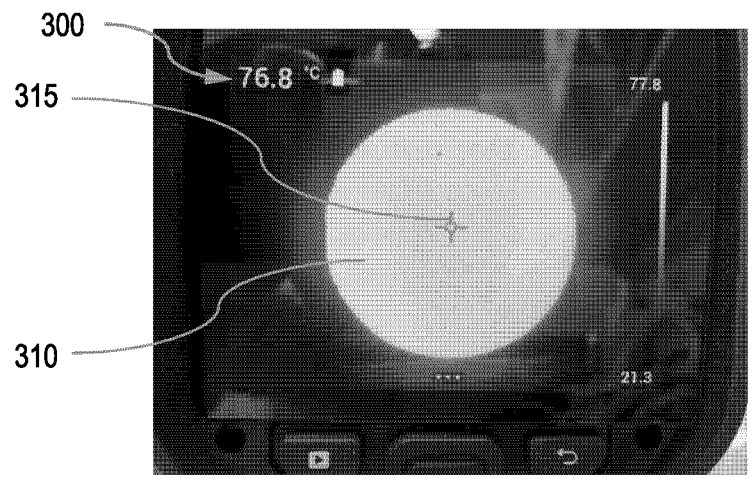
FIGS. 3A and 3B each illustrate an image of a scene captured by a thermal camera.
Figure 3B:

As an example, FIGS. 3A and 3B illustrate an image 300 and 305, respectively, of a scene captured by a thermal camera (e.g., the imaging device 105). The image 300 of FIG. 3A includes an object 310 in the scene. The thermal camera determines/provides a temperature reading of 76.8° C. at a location in the scene indicated by a crosshair 315. The image 305 of FIG. 3B includes the object 310 partially obstructed by a cooler object 320. As shown in the image 305, the cooler object 320 has a rectangular cross-section and a hole to expose a portion of the object 310. The cooler object 320 may be an obstruction/mask digitally simulated/provided in the scene or a physical object/mask placed in front of the object 310. The thermal camera determines/provides a temperature reading of 75.7° C. for the object 310 at a location in the scene indicated by a crosshair 325. In this regard, although the true temperature of the object 310 is the same in both of the images 300 and 305, a temperature measurement is 1.1° C. lower in the image 305 with the small object (e.g., a portion of the object 310). The temperature measurement in the image 305 is lower than the temperature measurement in the image 300 since pixel values that neighbor a pixel value(s) associated with the crosshair 325 capture the cooler object 320 and are thus lower than pixel values that neighbor a pixel value(s) associated with the crosshair 315, which capture the object 310. In an embodiment, stray light mitigation techniques provided herein may reduce or eliminate such a temperature difference between large and small objects of the same temperature, thus increasing thermal performance.

It is noted that the images 300 and 305 may be, for example, images presented to a user on a camera display screen of the thermal camera or on a viewfinder of the thermal camera. The images 300 and/or 305 may be preview images (e.g., on the camera display screen or viewfinder) prior to the user pressing a button on or otherwise communicatively coupled to the thermal camera to photograph the images. As an example, on the viewfinder, the thermal camera may adjust the temperature readings in near real-time as the crosshair location and/or the captured scene changes. In other cases, the images 300 and 305 may be photographs stored in memory and retrieved by the thermal camera for display to the user and, in some cases, processing (e.g., analysis, stray light mitigation computations).

Figure 4:
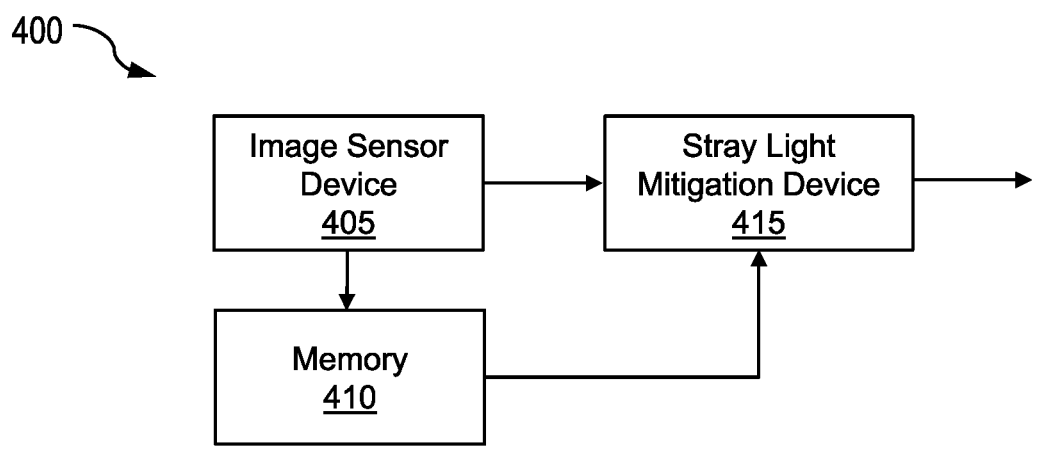
FIG. 4 illustrates an example system for facilitating stray light mitigation in accordance with one or more embodiments of the present disclosure.

FIG. 4 illustrates an example system 400 for facilitating stray light mitigation in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 400 includes an image sensor device 405, a memory 410, and a stray light mitigation device 415 (e.g., also referred to as a stray light compensation device). In an embodiment, the image sensor device 405, the memory 410, and/or the stray light mitigation device 415 may be implemented using one or more processing circuits on a single chip or distributed across two or more chips.

The image sensor device 405 includes a detector array and a readout circuit. The image sensor device 405 receives light from a scene and generates images based on the light. The light received by the image sensor device 405 may include stray light. In some cases, the image sensor device 405 may generate data values based on visible-light or infrared light. As an example, the detector array is an infrared detector array (e.g., microbolometer array) that detects infrared radiation (e.g., thermal IR radiation). The image sensor device 405 may include an FPA to capture infrared light and generate infrared data values based on the infrared light. The FPA may include or may be coupled to an ADC circuit that generates infrared data values based on infrared radiation. A 16-bit ADC circuit may generate infrared data values that range from 0 to 65,535. In an embodiment, the image sensor device 405 may be implemented by the imaging capture component 115. The memory 410 receives images generated by the image sensor device 405 and/or the stray light mitigation device 415. In some cases, the memory 410 may receive images from other devices. In an embodiment, the memory 410 may be implemented by the memory component 115.

The stray light mitigation device 415 receives images generated by the image sensor device 405 and/or images stored in the memory 410. The stray light mitigation device 415 may generate a stray light compensated (SLC) image based on one or more images from the image sensor device 405 and/or the memory 410. In some cases, the stray light mitigation device 415 may receive images from other devices. The SLC image may then be provided for further processing (e.g., other noise-reducing processing, fusing with images of the same or other wavebands, etc.), storage (e.g., by the memory 410 and/or other memory), and/or display.

In an embodiment, an SLC image associated with a time instance k, denoted as $I_{SLC}(k)$, may be based on an image associated with (e.g., captured at) a time instance k, denoted as $I(k)$, and an image associated with a time instance k−1, denoted as $I(k-1)$. The SLC image may involve a convolution of the $I(k)$ and a kernel and/or a convolution of the $I(k-1)$ and a kernel. In an aspect, $I(k)$, $I(k-1)$, and $I(k+1)$ may be referred to as a current image, a previous image, and a next image, respectively. In some cases, the current image may be temporally adjacent and subsequent to the previous image, and the next image may be temporally adjacent and subsequent to the current image. It is noted that, although various equations and description in the present disclosure are provided in relation to discrete time instances (e.g., a current time instance k and its preceding and adjacent time instance k−1), the equations and description may generally apply to continuous time (e.g., with integrals in continuous time rather than summations in discrete time). For example, a current image may be associated with a time $t_1$ and denoted as $I(t_1)$, a previous image may be associated with a time $t_0$ and denoted as $I(t_0)$, and a next image may be associated with a time $t_2$ and denoted as $I(t_2)$. A time duration between $t_1$ and $t_2$ may be, but need not be, the same as a time duration between $t_2$ and $t_3$.

In one or more embodiments, the stray light in images from the image sensor device 405 and/or the images stored in the memory 410 may be mitigated using convolutions with multiple kernels. As one non-limiting example, an SLC image $I_{SLC}(k)$ may be provided by:

$$I_{SLC}(k) = p_0 \cdot I(k) + p_1 \cdot \text{mean}[I(k-1)] + K_3 * I(k) + K * I(k-1) \quad \text{Equation (2)}$$

where $\text{mean}[I(k-1)]$ is an average of $I(k-1)$, $p_0$ is a scalar valued parameter, $p_1$ is a scalar valued parameter, $K_3$ is a kernel to convolve with $I(k)$, and $K$ is a kernel to convolve with $I(k-1)$, represents a scalar multiplication operator, and * represents a convolution operator. In some cases, the time instances k and k−1 are temporally adjacent, in which case $I(k)$ is temporally adjacent and subsequent to $I(k-1)$. The kernel $K_3$ may be a 3×3 moving average convolution. As an example, the kernel $K_3$ may be a constant 3×3 matrix with a constant value $p_3/9$. A result of $K_3 * I(k)$ and $K * I(k-1)$ may be referred to as convolution outputs.

As another non-limiting example, the SLC image $I_{SLC}(k)$ may be provided by:

$$I_{SLC}(k) = p_0 \cdot I(k) + p_1 \cdot \text{mean}[I(k-1)] + K_3 * I(k) + K_5 * I(k) + \ldots + K_{2n+1} * I(k) + K * I(k-1) \quad \text{Equation (3)}$$

where $K_5, \ldots,$ and $K_{2n+1}$ are kernels to convolve with $I(k)$. The kernel $K_5$ and $K_{2n+1}$ may be a 5×5 moving average convolution and a $(2n+1) \times (2n+1)$ moving average convolution, respectively, where n is a window size as provided below. In this regard, relative to using the convolution $K_3$ in Equation (2), convolutions may be expanded to include $K_5, \ldots,$ and/or $K_{2n+1}$ to use more neighboring pixels as shown in Equation (3). It is noted that variations of Equations (2) and (3) may include one or more of the $K_3 * I(k)$ term, $K_5 * I(k)$ term, and/or $K_{2n+1} * I(k)$ term, or none of them. A size of the convolutions (e.g., 5×5 for $K_5$, 3×3 for $K_3$) to perform on the current image $I(k)$ and/or a number of convolution terms to implement (e.g., $K_3 * I(k)$, $K_5 * I(k)$, ..., and/or $K_{2n+1} * I(k)$) generally depends on application (e.g., desired performance, real time or non-real time processing) and computational resources/costs (e.g., hardware resources, software resources).

The kernel $K$ may be formed of moving averages (e.g., also referred to as moving average convolutions) and may be provided by:

$$K = \Sigma K_n^d(I) \quad \text{Equation (4)}$$

where $K_n^d(I)$ is a moving average function (e.g., also referred to as a moving average convolution or simply a moving average) on an image I. The moving average function is a moving average with an n-by-n square window and a down-sampling factor d, where $n \geq d$. In some cases, n and d may both be even. As such, the moving average function $K_n^d(I)$ may be referred to as a down-sampled, moving average function.

Equations (2) and (3) provide SLC images that depend in part on the previous image $I(k-1)$. Such implementations may be utilized, for example, for FPGA programming since, when compensating in a certain pixel of the current image $I(k)$, not all neighboring pixel values may be present yet in the current image $I(k)$ and, as such, pixel values from the previous image are used. In other implementations, an SLC image may be determined/generated based on the current image $I(k)$ and not on the previous image $I(k-1)$ and/or other images. In an aspect, with respect to Equations (2) and (3), $K$ may be determined using the image $I(k)$, denoted as $K(I(k))$, or the image $I(k-1)$, denoted as $K(I(k-1))$. In this aspect, $K * I(k-1)$ in Equations (2) and/or (3) may include $K(I(k)) * I(k-1)$ or $K(I(k-1)) * I(k-1)$. $K(I(k-1)) * I(k-1)$ may be used for stray light mitigation in implementations where not all neighboring pixel values may be present in the current image $I(k)$ when compensating in a certain pixel of the current image $I(k)$.

With indexing of the image I starting at $[0,0]$, a pixel $[r, c]$ of the moving average function $K_n^d(I)$ may be provided by:

$$(K_n^d(I))[r, c] = \frac{p_n}{n^2} \sum_{\substack{i \in Idx(r,n,d) \\ j \in Idx(c,n,d)}} I[i, j] \quad \text{Equation (5)}$$

where $p_n$ is a parameter of the convolution, an index set $$Idx(x, n, d) = \left\{ i \mid -\frac{n}{2} + F(x, d) \leq i < \frac{n}{2} + F(x, d) \right\},$$

and a function $$F(x, d) = x + \frac{d}{2} - \text{mod}(x, d)$$

with mod being a modulo operator. In some cases, padding (e.g., a first order padding) may be applied such that pixels outside edges of the image I are set to the pixel value on the edge. For example, a pixel value I[i, j]=I[0, j] for i<0 and j within the image edges.

The parameters $p_0$, $p_1$, $p_3$ (related to $K_3$), and $p_n$ (related to $K_n^d$(I)) may be determined (e.g., as part of calibration of the imaging system) using images of objects having different sizes and known temperatures. Optimization may be performed to determine values for the parameters that reduce an effect of object size dependence of temperatures in images.

In some aspects, depending on computational algorithm and/or hardware, n and d may be powers of two to facilitate computation. Using such an algorithm and/or hardware, powers of two may allow for fast division (e.g., $1/n^2$) in the moving average calculation. For example, the fast division may be effectuated through a shift operator. As non-limiting examples, $d=2^k$ for some integer k and $n=2^0 d, 2^1 d, \ldots, 2^{N-1} d$ for some integer N, where N is the number of moving average squares used. In general, values for k and N are determined based on a desired quality/performance and complexity that may be accommodated given resources/requirements (e.g., hardware used to implement equations, timing requirements, etc.). As an example, a higher number N of moving average squares used is generally associated with higher quality (e.g., thermal performance) of the SLC image $I_{SLC}(k)$. In some cases, different down-sampling squares (e.g., different d) may be used for different n. For example, larger down-sampling may be used for larger moving average squares. As an example for determining k and N, a largest square-convolution to achieve a desired quality may be determined to be $2^M$. This largest square-convolution may be determined using measurements and simulations of the quality. A value for k (and thus d) appropriate for a given implementation (e.g., hardware implementation such as FPGA implementation) may be selected. With M=N−1+k, a value N is provided by N=M−k+1. If a desired quality/complexity is not achieved, the possibility of using different down-sample sizes d for different squares may be considered/investigated.

Figure 5:
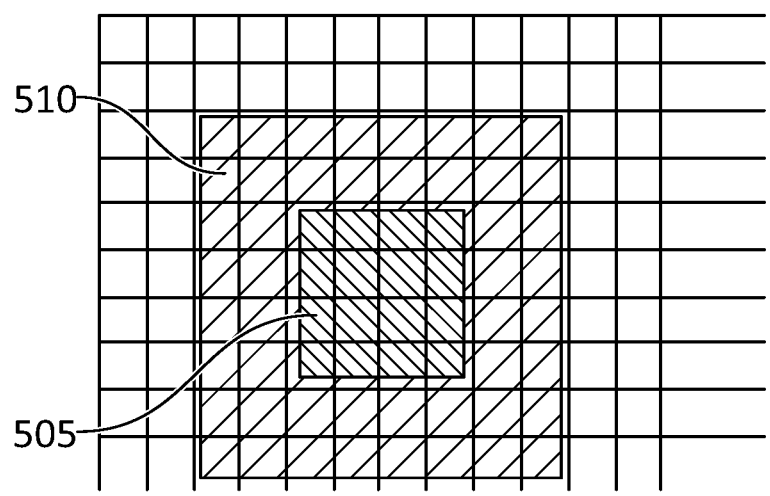
FIG. 5 illustrates an example of a moving average function in accordance with one or more embodiments of the present disclosure.

As an example, for n=8 and d=4 and within the range 4≤r≤7, the function F(r, d)=6. The index set is provided by Idx(r, n, d)={i|−4+6≤i<4+6}={2, 3, . . . , 9}. The resulting moving average function $K_n^d$(I) may be illustrated in FIG. 5, where for all pixels in a d-by-d square 505, an index set used in the $K_n^d$(I) calculation will be a n-by-n square 510 with the d-by-d square 505 in its center.

Each moving average may be associated with a respective window size. Although the foregoing provides moving averages based on square windows (e.g., window length is the same as window width), the moving averages may be based on non-square windows, such as rectangular windows having a window length different from a window width.

In some cases, to facilitate computation of the moving average for any $K_n^d$(I), intermediate images may be computed. An intermediate image may be provided by:

$$\sum_{\substack{i \leq r \\ j \leq c}} I[i, j] \qquad \text{Equation (6)}$$

In this regard, each intermediate image may provide a summation of image pixels starting from the starting index [0,0], $$\sum_{\substack{i \in Idx(r,n,d) \\ j \in Idx(c,n,d)}} I[i, j]$$

in Equation (5) may be determined through a combination (e.g., addition and subtraction) of intermediate images. Pixels of the intermediate images associated with pixels [r, c] outside the image I may be padded such that pixels outside edges of the image I are set to the pixel value on the edge as provided above. In some cases, the number of pixels outside the image I is generally based on a largest moving average square $n_{max}$, in which a size of a border around the image I may be provided by $$\frac{n_{max}}{2}.$$

In the above example with $n=2^0 d, 2^1 d, \ldots, 2^{N-1} d$, $n_{max}=2^{N-1} d$.

Figure 6:
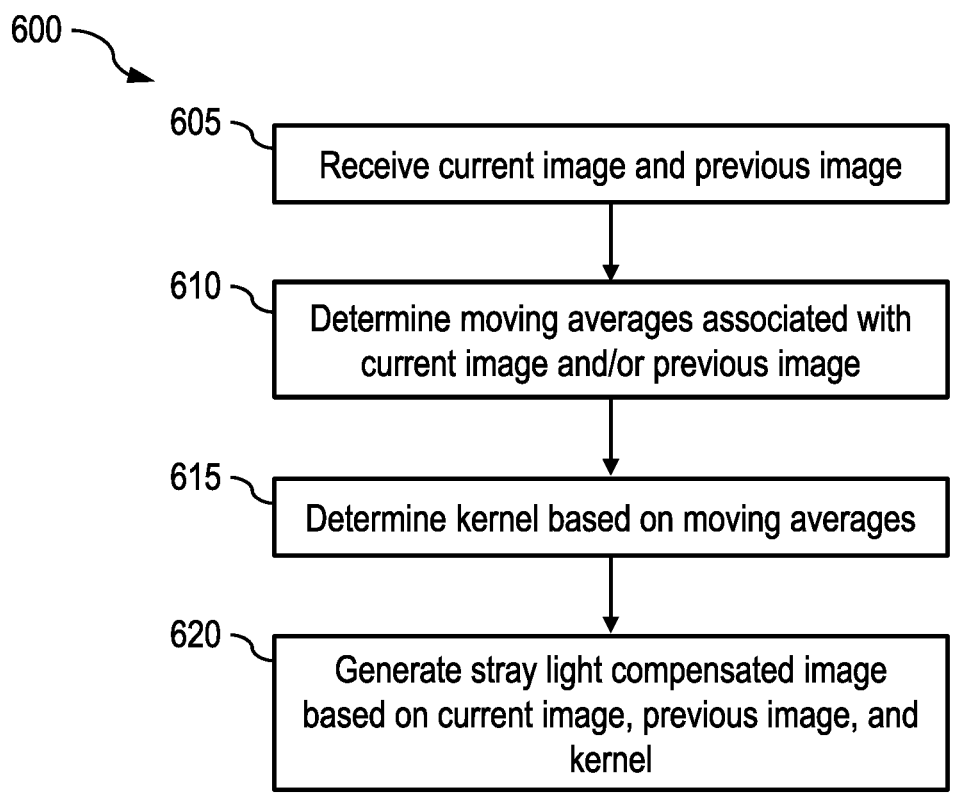
FIG. 6 illustrates a flow diagram of an example process for facilitating stray light mitigation in accordance with one or more embodiments of the present disclosure.

FIG. 6 illustrates a flow diagram of an example process 600 for facilitating stray light mitigation in accordance with one or more embodiments of the present disclosure. Although the process 600 is primarily described herein with reference to the system 400 of FIG. 4 for explanatory purposes, the process 600 can be performed in relation to other systems for facilitating stray light mitigation. Note that one or more operations in FIG. 6 may be combined, omitted, and/or performed in a different order as desired.

At block 605, the stray light mitigation device 415 receives images (e.g., infrared images, visible-light images). The images may include a current image (e.g., image I(k)) and a previous image (e.g., image I(k−1)). In some cases, the current image is temporally adjacent and subsequent to the previous image. The stray light mitigation device 415 may receive the current image directly from an image sensor device that captures/generates the current image and/or from a memory that stores the current image. As an example, the stray light mitigation device 415 may receive the current image from the image sensor device 405 (or other image sensor device) and the previous image from the memory 410 (or other memory). As another example, the stray light mitigation device 415 may receive the current image and the previous image from the memory 410 and/or other memory. In an embodiment, the current image and the previous image may represent a scene at different time instances and distorted at least in part by stray light.

At block 610, the stray light mitigation device 415 determines moving averages associated with the previous image and/or the current image. In an aspect, each moving average may be denoted as $K_n^d$ (I) and characterized by a square window size n and a down-sampling factor d. In some cases, for a given window size n, the moving average convolution $K_n^d$ (I) may be computed for one or more values of d. In some cases, different values of d (e.g., different down-sampling squares) may be used for different values of n. For example, larger down-sampling (e.g., larger d) may be used for larger moving average squares (e.g., larger n). In some cases, non-square windows may be used, in which case each moving average may be characterized using multiple dimensional parameters (e.g., window length and width for a rectangular window) and/or multiple down-sampling factors. In an embodiment, each pixel [r, c] of $K_n^d$ (I)[r, c] may be determined according to Equation (5). In an aspect, the moving averages are associated with the previous image, such as in implementations in which not all neighboring pixel values may be present in the current image I(k) when compensating in a certain pixel of the current image I(k). At block 610, the stray light mitigation device 415 determines a kernel based on the moving averages. The kernel may be a combination of the moving averages. In an embodiment, the kernel may be denoted as K and provided as a sum of the moving averages $K_n^d$ (I) as provide in Equation (4).

At block 615, the stray light mitigation device 415 generates an SLC image based on the current image, the previous image, and the kernel. In an aspect, the SLC image may be based on the current image and a convolution of the kernel and the previous image. In some cases, the SLC image may be further based on a statistic (e.g., a mean) of the previous image and a convolution of the current image with a kernel, such as provided in Equations (2) and (3). The SLC image may then be provided for further processing (e.g., other noise-reducing processing, fusing with images of the same or other wavebands, etc.), storage (e.g., by the memory 410), and/or display. The process 600 may be considered to provide a stray light compensated version of the current image and/or performed to effectuate/perform stray light compensation of the current image. The process 600 may then be repeated for a next image (e.g., image I(k+1)). In this regard, in a next iteration of the process 600, the image I(k+1) is the current image and the image I(k) is the previous image.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. An imaging system comprising:
a processing circuit is configured to:
 determine a plurality of moving averages associated with a first image, wherein each of the plurality of moving averages is associated with a respective window size;
 determine a first kernel based on the plurality of moving averages;
 convolve the first kernel and the first image to obtain a first convolution output;
 convolve a second kernel and a second image that temporally follows the first image to obtain a second convolution output; and
 generate a stray light compensated image based on the first convolution output and the second convolution output to provide to a display device or a memory.

2. The imaging system of claim 1, wherein each of the plurality of moving averages is a two-dimensional moving average associated with a respective window size, and wherein the respective window size comprises a respective window length and a respective window width.

3. The imaging system of claim 2, wherein each of the plurality of moving averages is associated with a square window.

4. The imaging system of claim 1, wherein the second kernel comprises a three-by-three moving average convolution, and wherein the second image is temporally adjacent to and subsequent to the first image.

5. The imaging system of claim 1, wherein the first kernel is based on a sum of the plurality of moving averages.

6. The imaging system of claim 5, wherein the second image is temporally adjacent to and subsequent to the first image.

7. The imaging system of claim 6, wherein the processing circuit is further configured to determine a mean of the first image, and wherein the stray light compensated image is further based on the mean of the first image.

8. The imaging system of claim 7, wherein the stray light compensated image is based on a combination of the second image, the mean of the first image, the first convolution output, and the second convolution output.

9. The imaging system of claim 1, further comprising an image sensor device configured to capture electromagnetic radiation and generate the first image based on the electromagnetic radiation.

10. The imaging system of claim 9, wherein the image sensor device comprises an infrared image sensor device, and wherein the electromagnetic radiation comprises infrared radiation.

11. The imaging system of claim 1, wherein the processing circuit is further configured to obtain the first image from a memory.

12. A method comprising
 determining a plurality of moving averages associated with a first image, wherein each of the plurality of moving averages is associated with a respective window size;
 determining a first kernel based on the plurality of moving averages;
 convolving the first kernel and the first image to obtain a first convolution output;
 convolving a second kernel and a second image that temporally follows the first image to obtain a second convolution output; and generating a stray light compensated image based on the first convolution output and the second convolution output to provide to a display device or a memory.

13. The method of claim 12, wherein the first kernel is based on a sum of the plurality of moving averages.

14. The method of claim 12, wherein each of the plurality of moving averages is a two-dimensional moving average associated with a respective window size.

15. The method of claim 12, wherein the second image is temporally adjacent to and subsequent to the first image, and wherein the stray light compensated image is further based on a combination of the second image and a mean of the first image.

16. The method of claim 12, further comprising:
capturing electromagnetic radiation and generating the first image based on the electromagnetic radiation; or obtaining the first image from a memory.

17. The method of claim 12, wherein each of the plurality of moving averages comprises a respective down-sampled moving average associated with the respective window size and a respective down-sampling factor.

18. The imaging system of claim 1, wherein each of the plurality of moving averages comprises a respective down-sampled moving average associated with the respective window size and a respective down-sampling factor.

19. The imaging system of claim 18, wherein each down-sampled moving average is associated with a first window having the respective window size and a second window having a size based on the respective down-sampling factor, and wherein the first window encompasses the second window.

20. The imaging system of claim 1, wherein the processing circuit is further configured to determine a mean of the first image, and wherein the stray light compensated image is further based on the mean of the first image.

* * * * *

UNITED STATES PATENT AND TRADEMARK OFFICE
CERTIFICATE OF CORRECTION

PATENT NO. : 12,513,415 B2
APPLICATION NO. : 18/509067
DATED : December 30, 2025
INVENTOR(S) : Karl Mårtensson Page 1 of 1

It is certified that error appears in the above-identified patent and that said Letters Patent is hereby corrected as shown below:

In the Specification

In the DETAILED DESCRIPTION:

Column 7, Lines 51-52, change "by the ROIL." to --by the ROIC.--.

Signed and Sealed this
Tenth Day of February, 2026

John A. Squires
*Director of the United States Patent and Trademark Office*